US010216470B2

(12) United States Patent
Song et al.

(10) Patent No.: US 10,216,470 B2
(45) Date of Patent: Feb. 26, 2019

(54) DISPLAY SCREEN AND DISPLAY DEVICE

(71) Applicant: BOE TECHNOLOGY GROUP CO., LTD., Beijing (CN)

(72) Inventors: Song Song, Beijing (CN); Kazuyoshi Nagayama, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 15/309,964

(22) PCT Filed: Apr. 8, 2016

(86) PCT No.: PCT/CN2016/078845
§ 371 (c)(1),
(2) Date: Nov. 9, 2016

(87) PCT Pub. No.: WO2016/197687
PCT Pub. Date: Dec. 15, 2016

(65) Prior Publication Data
US 2017/0242644 A1    Aug. 24, 2017

(30) Foreign Application Priority Data

Jun. 8, 2015 (CN) .......................... 2015 1 0310282

(51) Int. Cl.
*G06F 3/14* (2006.01)
*G06F 1/16* (2006.01)
(Continued)

(52) U.S. Cl.
CPC .......... *G06F 3/1423* (2013.01); *G06F 1/1647* (2013.01); *G06F 1/1652* (2013.01);
(Continued)

(58) Field of Classification Search
CPC .... G06F 3/1423; G06F 1/1647; G06F 1/1652; G09G 3/20; G09G 3/3225; G09G 3/3648; G09G 2300/0426; G09G 2310/0286
See application file for complete search history.

(56) References Cited

U.S. PATENT DOCUMENTS

| 8,619,014 | B2 * | 12/2013 | Maki | .................... | G09G 3/3655 |
| | | | | | 345/98 |
| 2004/0036702 | A1 * | 2/2004 | Kageyama | ........... | G09G 3/2011 |
| | | | | | 345/690 |

(Continued)

FOREIGN PATENT DOCUMENTS

| CN | 1732496 A | 2/2006 |
| CN | 101287020 A | 10/2008 |

(Continued)

OTHER PUBLICATIONS

Chinese Office Action dated Nov. 4, 2016.
Search Report and Written Opinion dated Jun. 27, 2016 from State Intellectual Property Office of the P.R. China.

*Primary Examiner* — Sejoon Ahn
(74) *Attorney, Agent, or Firm* — Dilworth & Baresse, LLP; Michael J. Musella, Esq.

(57) ABSTRACT

A display screen and a display device are provided. The display device includes: a first display screen; a display screen group arranged on a back surface of the first display screen, the display screen group including at least one second display screen, and a display surface of the second display screen facing the first display screen; and a rotating shaft, the rotating shaft connecting a first side edge of each of the second display screens in the display screen group with a first side edge of the first display screen and being perpendicular to the first display screen and the second display screen. The display device has characteristics of adjustable display screen size and strong flexibility in use.

18 Claims, 7 Drawing Sheets

(51) Int. Cl.
*G09G 3/3225* (2016.01)
*G09G 3/36* (2006.01)
*G09G 3/20* (2006.01)

(52) U.S. Cl.
CPC ............ *G09G 3/20* (2013.01); *G09G 3/3225* (2013.01); *G09G 3/3648* (2013.01); *G09G 2300/0426* (2013.01); *G09G 2310/0286* (2013.01)

(56) References Cited

U.S. PATENT DOCUMENTS

| | | | | |
|---|---|---|---|---|
| 2004/0263438 | A1* | 12/2004 | Uesugi | G09G 3/3275 345/76 |
| 2004/0263465 | A1* | 12/2004 | Hirosawa | G09G 3/3266 345/100 |
| 2006/0114208 | A1* | 6/2006 | Senda | G09G 3/3614 345/90 |
| 2007/0057899 | A1* | 3/2007 | Yamashita | G09G 3/3677 345/100 |
| 2007/0077672 | A1* | 4/2007 | Kang | G02F 1/13454 438/30 |
| 2007/0245193 | A1* | 10/2007 | Wei | G09G 3/3677 714/727 |
| 2009/0002357 | A1* | 1/2009 | John | G09G 3/3688 345/212 |
| 2009/0231289 | A1 | 9/2009 | Chang | |
| 2012/0001831 | A1 | 1/2012 | Smith et al. | |
| 2014/0347405 | A1* | 11/2014 | Kumeta | G09G 5/10 345/690 |

FOREIGN PATENT DOCUMENTS

| | | |
|---|---|---|
| CN | 101594429 A | 12/2009 |
| CN | 202855256 U | 4/2013 |
| CN | 103295643 A | 9/2013 |
| CN | 103729158 A | 4/2014 |
| CN | 104320714 A | 1/2015 |
| CN | 104637431 A | 5/2015 |
| CN | 104851405 A | 8/2015 |
| TW | 201115529 A1 | 5/2011 |
| TW | I358934 B | 2/2012 |

* cited by examiner

DISPLAY SCREEN AND DISPLAY DEVICE

TECHNICAL FIELD

Embodiments of the present disclosure relate to a display screen and a display device.

BACKGROUND

With continuous development of science and technology, a mobile phone can realize more and more functions. In addition to a call function, the mobile phone may be used for accessing Internet, watching video, reading e-books and so on. A size of a display screen of the mobile phone directly affects user's experience on the above functions. For example, in the case that the mobile phone is used for watching video, the bigger the display screen is, the better the user's experience is. However, in the case that the mobile phone is used for calling, the size of the display screen is no longer so important to the user. At present, the size of the display screen of the mobile phone keeps constant, which cannot be adjusted by the user according to actual situations, so that flexibility of using the mobile phone is reduced.

SUMMARY

According to embodiments of the disclosure, a display device is provided. The display device comprises: a first display screen; a display screen group, arranged on a back surface of the first display screen, the display screen group including at least one second display screen, and a display surface of the second display screen facing the first display screen; and a rotating shaft; the rotating shaft connecting a first side edge of each second display screen in the display screen group with a first side edge of the first display screen, and being perpendicular to the first display screen and the second display screen.

For example, the second display screen includes a plurality of gate lines, a plurality of first switches, and a plurality of shift register units respectively connected with the gate lines; each of the gate lines of the second display screen includes a first sub-line and a second sub-line which are disconnected from each other, ends of the first sub-line and the second sub-line close to each other are respectively connected with a first end and a second end of the first switch, and the other end of the second sub-line is connected with the shift register unit; and a control end of each of the first switches of the second display screen is connected with a control line, and the control line is configured for inputting a turning-on signal and/or a turning-off signal to the control end of the first switch.

For example, the display screen group includes: two of the second display screens arranged side by side.

For example, side edges of the two second display screens close to each other are second side edges, side edges opposite to the second side edges are third side edges, the third side edge of each of the second display screens protruding out from a side edge of the first display screen which is on a same side with the third side edge of the second display screen; and at least a pixel unit of the second display screen protruding out from the first display screen is connected with the second sub-line.

For example, the first side edge of the second display screen intersects with the third side edge and the second side edge of the second display screen.

For example, in the case that the second display screen includes gate lines, shift register units and first switches, the shift register units of the second display screen are located on the third side edge, each of the gate lines of the second display screen is perpendicular to the third side edge; and a connecting line of positions where the first switches of the second display screen are located is perpendicular to the gate lines, and is located in a projection region of the side edge of the first display screen which is on the same side with the third side edge of the second display screen on the display surface of the second display screen.

For example, in the case that the second display screen includes the control line, a positioning part is arranged between the two second display screens; a second electrode is arranged on a side surface of each of the second display screens in contact with the positioning part, a first electrode is arranged on a side surface of the positioning part in contact with each of the second display screens and in a position corresponding to the second electrode, and two of the first electrodes of the positioning part are electrically connected with each other; and the display device further comprises a control module, the control module is connected with each of the second electrodes and the control line, and is configured for inputting the turning-off signal to the control line in a case where the first electrode is in contact with the second electrode and/or inputting the turning-on signal to the control line in a case where the first electrode is separated from the second electrode.

For example, the control module includes: a first resistor and a power source which are connected in series between two of the second electrodes; and a second resistor, one end of the second resistor being connected between the first resistor and the power source, and the other end of the second resistor being connected with the control line.

For example, a first magnetic part is further arranged on the side surface of each of the second display screens in contact with the positioning part, a second magnetic part is arranged on the side surface of the positioning part in contact with each of the second display screens and in a position corresponding to the first magnetic part, and the first magnetic part and the second magnetic part have opposite magnetic properties.

For example, the second display screens in the display screen group have a same width, and each of the second display screens and the first display screen have a same length.

For example, a sum of widths of the two second display screens is equal to a width of the first display screen, and a rotating shaft of each of the second display screens is located in a middle position of a region where the first side edge of the second display screen overlaps with the first side edge of the first display screen.

For example, there are a plurality of the second display screens, a third magnetic part and a fourth magnetic part are respectively arranged on side surfaces of two adjacent second display screens in contact with each other after the two adjacent second display screens rotate out from the first display screen, and the third magnetic part and the fourth magnetic part have opposite magnetic properties.

For example, the first display screen and the second display screens in the display screen group are all flexible screens.

According to embodiments of the disclosure, a display screen is provided. The display screen comprises a plurality of gate lines, a plurality of first switches, and a plurality of shift register units respectively connected with the gate lines. Each of the gate lines includes a first sub-line and a second sub-line which are disconnected from each other, ends of the first sub-line and the second sub-line close to each other are respectively connected with a first end and a second end of the first switch, and the other end of the second sub-line is connected with the shift register unit; and a control end of each of the first switches is connected with a control line, and the control line is configured for inputting a turning-on signal and/or a turning-off signal to the control end of the first switch.

For example, the shift register units are located on a third side edge of the display screen, the gate lines of the display screen are perpendicular to the third side edge, and a connecting line of positions where the first switches of the display screen are located is perpendicular to the gate lines.

For example, the display screen further comprises a second switch and a control module, and the control module is connected with the control line and the second switch; in the case that the second switch is turned off, the control module inputs the turning-off signal to the control line; and in the case that the second switch is turned on, the control module inputs the turning-on signal to the control line.

For example, the control module includes: a first resistor and a power source which are connected with the second switch in series; a second resistor, one end of the second resistor being connected between the first resistor and the power source, and the other end of the second resistor being connected with the control line.

BRIEF DESCRIPTION OF THE DRAWINGS

In order to clearly illustrate the technical solution of the embodiments of the present disclosure, the drawings of the embodiments will be briefly described in the following; it is obvious that the described drawings are only related to some embodiments of the present disclosure and thus are not limitative of the present disclosure.

DETAILED DESCRIPTION

In order to make the objective, technical solutions, and advantages of the present disclosure clearer, the technical solutions in the embodiments of the present disclosure are described more clearly and completely hereinafter in conjunction with the accompanying drawings. It is obvious that the described embodiments are just a part but not all of the embodiments of the present disclosure. Based on the described embodiments herein, those skilled in the art can obtain other embodiment(s), without any inventive work, which should be within the scope of the present disclosure.

Embodiment I

Figure 1:
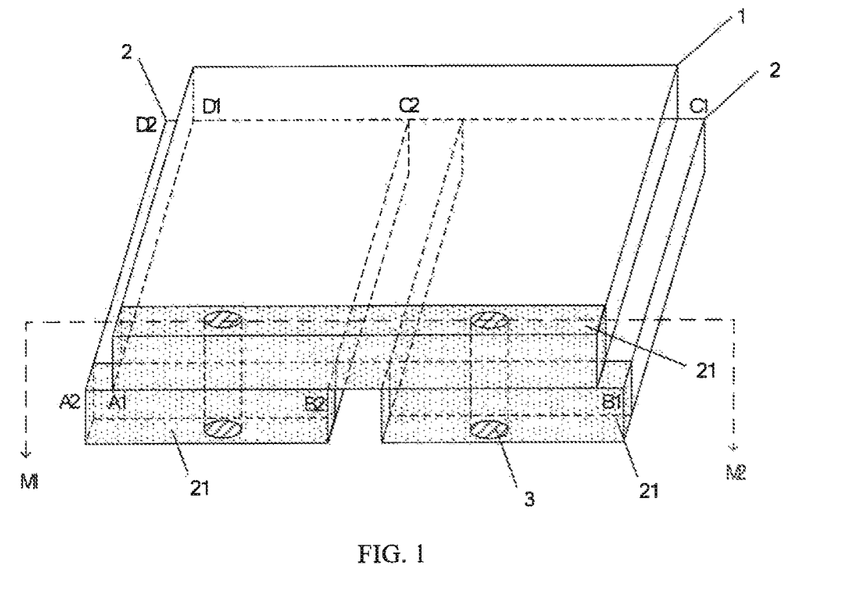
FIG. 1 is a structural schematic view illustrating a display device provided by an embodiment of the present disclosure.

The embodiment of the present disclosure provides a display device, and referring to FIG. 1, the display device comprises: a first display screen 1; a display screen group arranged on a back surface A1B1C1D1 of the first display screen 1, the display screen group including at least one second display screen 2, and a display surface A2B2C2D2 of the second display screen 2 facing the first display screen 1; and a rotating shaft 3, the rotating shaft 3 connecting a first side edge 21 of each second display screen 2 in the display screen group with a first side edge 21 of the first display screen 1, and being perpendicular to the first display screen 1 and the second display screen 2.

In the display device as described above, both the first display screen and the second display screen include a display surface for displaying and a back surface opposite to the display surface. In addition, a number of the second display screens included in the display screen group is not limited by the embodiment of the present disclosure; exemplarily, the display screen group includes two second display screens, or includes three second display screens; and the embodiment and drawings of the present disclosure are all described by taking an example that the display screen group includes two second display screens. In addition, the first display screen may completely cover the respective second display screens in the display screen group, or may partially cover the respective second display screens in the display screen group, which is not limited by the embodiment of the present disclosure.

In the display device described above, the first side edge 21 of the first display screen 1 is a side edge connected with the second display screen in the display screen group through the rotating shaft. Referring to FIG. 1, the first side edge 21 of the first display screen 1 is a front side edge of the first display screen 1; however, the first side edge 21 of the first display screen 1 may be a back side edge of the first display screen 1 in FIG. 1, or other side edge of the first display screen 1 in FIG. 1. The embodiment and drawings of the present disclosure are described by taking an example that the first side edge 21 of the first display screen 1 is the front side edge of the first display screen 1, which is only convenient for description of the present disclosure and simplifying the description, but do not indicate or imply that the devices or components must have specific directions, or be constructed or operated in the specific directions, and are not limitative of the present disclosure. The first side edge 21 of the second display screen 2 has a meaning similar to that of the first side edge 21 of the first display screen 1, which will not be repeated in detail.

In the display device described above, a number and a specific position of the rotating shaft are not limited by the embodiment of the present disclosure, as long as the rotating shaft connects the first side edge of each second display screen with the first side edge of the first display screen, and the second display screen is capable of rotating around the rotating shaft so as to rotate out from the back surface of the first display screen; and exemplarily, the number of the rotating shaft(s) is equal to the number of the second display screen(s) included in the display screen group, and the embodiment and drawings of the present disclosure are both described by taking an example that the display device comprises two rotating shafts.

In the display device described above, the first display screen and the second display screen for example are liquid crystal display screens or self-luminous display screens, such as, Organic Light Emitting Diode (OLED) display screens; however, the first display screen and the second display screen may be display screens of other types, which are not specifically limited here, and may be selected according to actual situations.

The embodiment of the present disclosure provides the display device, and the display device comprises the first display screen and the display screen group arranged on the back surface of the first display screen; the display screen group includes at least one second display screen, and the display surface of the second display screen faces the first display screen, and meanwhile the second display screen in the display screen group is capable of rotating around the rotating shaft. For example, the display device uses the first display screen for displaying in the case that the second display screen is located on the back surface of the first display screen; and the display device uses the first display screen and the second display screen for displaying jointly in the case the second display screen rotates around the rotating shaft and rotates out from the back surface of the first display screen. The display device according to the embodiment of the disclosure has characteristics of adjustable display screen size and strong flexibility in use.

Figure 2:
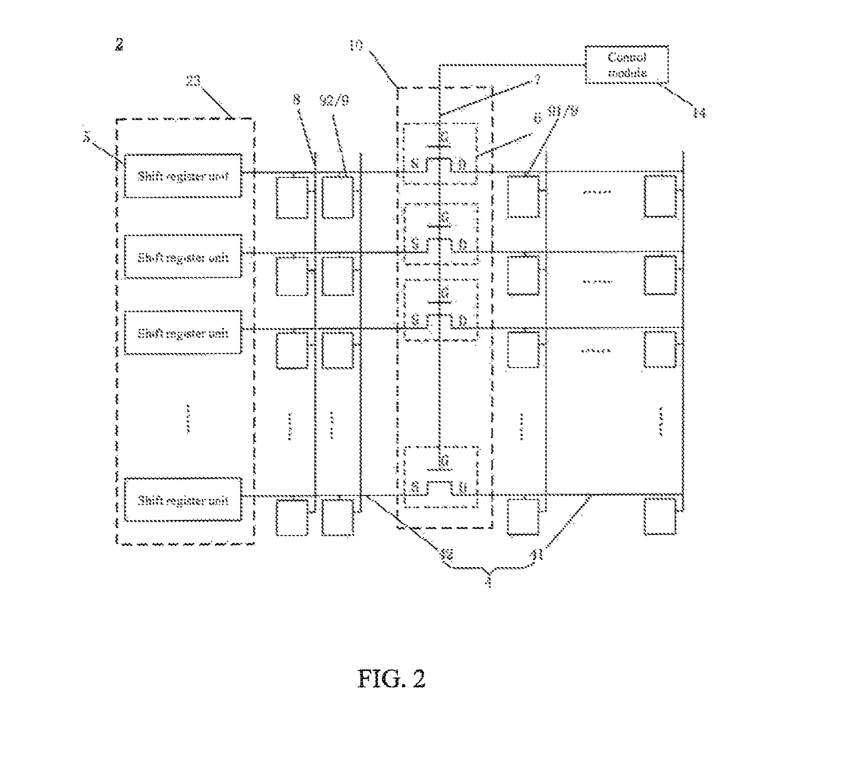
FIG. 2 is a structural schematic view illustrating a second display screen in FIG. 1.

For example, referring to FIG. 2, the second display screen 2 includes a plurality of gate lines 4, and a plurality of shift register units 5 respectively connected with the gate lines 4; each gate line 4 of the second display screen 2 includes a first sub-line 41 and a second sub-line 42 which are disconnected from each other, and ends of the first sub-line 41 and the second sub-line 42 close to each other are respectively connected with a first end and a second end of a first switch 6, and the other end of the second sub-line 42 is connected with the shift register unit 5; and a control end of each first switch 6 of the second display screen 2 is connected with a control line 7, and the control line 7 is configured for inputting a turning-on signal and/or a turning-off signal to the control end of the first switch 6.

It should be noted here that, positions of the gate lines, the shift register units, the first switches and the control line are not specifically limited by the embodiment of the present disclosure, as long as the connecting relationship described above is met, and the embodiment of the present disclosure is described by taking positional relationships shown in FIG. 2 as an example. In addition, referring to FIG. 2, the second display screen 2 further includes a plurality of data lines 8, and a plurality of pixel units 9 formed by the plurality of data lines 8 and the plurality of gate lines 4 intersecting with each other, and each pixel unit 9 is connected with its corresponding gate line 4 and its corresponding data line 9, so as to acquire a gate line signal and a data line signal to realize display. In addition, referring to FIG. 2, the plurality of pixel units 9 comprises a first pixel unit 91 and a second pixel unit 92, the first sub-line 41 of each of the gate lines 4 is connected with the first pixel unit 91, and the second sub-line 42 of each of the gate lines 4 is connected with the second pixel unit 92. In addition, the second display screen may further include other layer structures or thin films and the like, which will not be repeated here. In addition, a disconnecting position of each gate line is not limited by the embodiment of the present disclosure, which may be determined according to actual situations.

The register unit 5 is configured for supplying a scanning voltage to the gate line 4 connected thereto. The register unit 5 in the embodiment of the present disclosure for example is a Gate Driver on Array (GOA) unit.

It should be further noted that, one end of the control line 7 is connected with the control end of each first switch, and the other end thereof may be connected with a control module, or may be directly connected with a signal source, which is not specifically limited here, as long as the control line 7 inputs the turning-on signal and/or the turning-off signal to the control end of the first switch.

In addition, the first switch may be a thin film transistor, or may be other component, and the embodiment and drawings of the present disclosure are both described by taking the thin film transistor as an example. It should be further noted that, a source electrode and a drain electrode of the thin film transistor in all the embodiments of the present disclosure are symmetrical, so that there is no distinction between the source electrode and the drain electrode. In the embodiment of the present disclosure, in order to distinguish the two electrodes of the thin film transistor from a gate electrode, one of the two electrodes is referred to as the source electrode, and the other electrode is referred to as the drain electrode. In addition, the transistors may be divided into an N-type and a P-type according to characteristics of the thin film transistors, and the following embodiment is described by taking the N-type thin film transistor as an example. Referring to FIG. 2, for example, the first end of the first switch 6 is the drain electrode D of the N-type thin film transistor, the second end is the source electrode S of the N-type thin film transistor, and the control end is the gate electrode G of the N-type thin film transistor. It may be contemplated that, implementation when using the P-type thin film transistor is apparent to those skilled in the art without any inventive work, which also falls into the protection scope of the embodiment of the present disclosure.

In the display device, referring to FIG. 2, the control line 7 is configured for inputting the turning-on signal and/or the turning-off signal to the control end of the first switch 6. In the case that the first switch 6 is in a normally-off state, the control line 7 is only configured for inputting the turning-on signal to the control end of the first switch 6, so as to turn on the first switch 6. In the case that the first switch 6 is in a normally-on state, the control line 7 is only configured for inputting the turning-off signal to the control end of the first switch 6, so as to turn off the first switch 6. In addition, the control line 7 for example is configured for inputting both the turning-on signal and the turning-off signal to the control end of the first switch 6, that is, the control line 7 is capable of inputting the turning-on signal to the control end of the first switch 6 and inputting the turning-off signal to the control end of the first switch 6, so as to turn on and turn off the first switch 6. The above three cases are not limited by the embodiment of the present disclosure, and a third case is generally implemented to turn on and turn off the first switch 6.

Referring to FIG. 2, in the second display screen, the turning-on signal and/or the turning-off signal is input to the first switch through the control line 7, so that whether the first sub-line 41 acquires a signal output from the shift register unit 5 is controlled, and further display or closing of the pixel unit connected with the first sub-line 41 is controlled, and thus partial display or full display of the second display screen 7 is realized.

For example, in order to reduce difficulty in fabrication and facilitate production, referring to FIG. 1, the display screen group includes two second display screens 2 arranged side by side.

Figure 3:
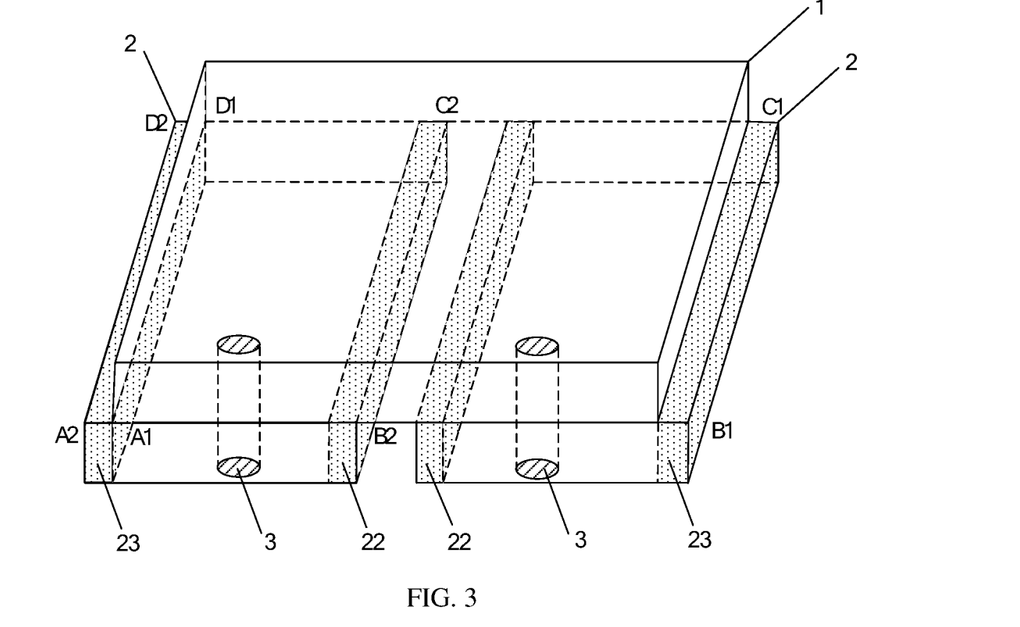
FIG. 3 is another structural schematic view illustrating the display device provided by the embodiment of the present disclosure.

For example, referring to FIG. 3, side edges of the two second display screens 2 close to each other are second side edges 22, side edges opposite to the second side edges 22 are third side edges 23, the third side edge 23 of each second display screen 2 protrudes out from a side edge of the first display screen 1 which is on a same side with the third side edge 23 of the second display screen 2; and at least the pixel unit of the second display screen protruding out from the first display screen 1 is connected with the second sub-line. For example, the first side edge 21 of the second display screen intersects with the third side edge 23 and the second side edge 21 of the second display screen. In the drawings, as an example, the first side edge 21 of the second display screen intersects with the third side edge 23 and the second side edge 21 of the second display screen perpendicularly.

In the display device, the two second display screens both have the side edge protruding out from the first display screen, and at least the pixel unit of the second display screen protruding out from the first display screen is connected with the second sub-line, so that the second sub-line controls the pixel unit of the second display screen protruding out from the first display screen to display or be turned off; and in the case that the second sub-line transmits the scanning signal, the pixel unit of the second display screen connected with the second sub-line realizes display. In this way, in the display device, at least a portion of the second display screen protruding out from the first display screen realize display while realizing display of the first display screen, so that a display size of the display device is increased.

For example, referring to FIG. 2, in the case that the second display screen 2 includes the gate lines 4, the shift register units 5 and the first switches 6, the shift register units 5 of the second display screen 2 are located on the third side edge 23, and each gate line 4 of the second display screen 2 is perpendicular to the third side edge 23; a connecting line of positions where the first switches 6 of the second display screen 2 are located is perpendicular to the gate lines 4, and located in a projection region 10 of the side edge of the first display screen which is on a same side with the third side edge 23 of the second display screen 2 on the display surface A2B2C2D2 of the second display screen 2.

In this way, the wiring structure is simplified, and an aperture ratio of the display device is improved. In addition, in the case that the connecting line of the positions where the first switches of the second display screen are located is located in the projection region of the side edge of the first display screen which is on the same side with the third side edge of the second display screen on the display surface of the second display screen, only the pixel unit of the second display screen protruding out from the first display screen is connected with the second sub-line; and in this way, the display device makes only the portion of the second display screen protruding out from the first display screen realizes display while realizing display of the first display screen, so that power consumption is minimized while increasing the display size of the display device.

Figure 4:
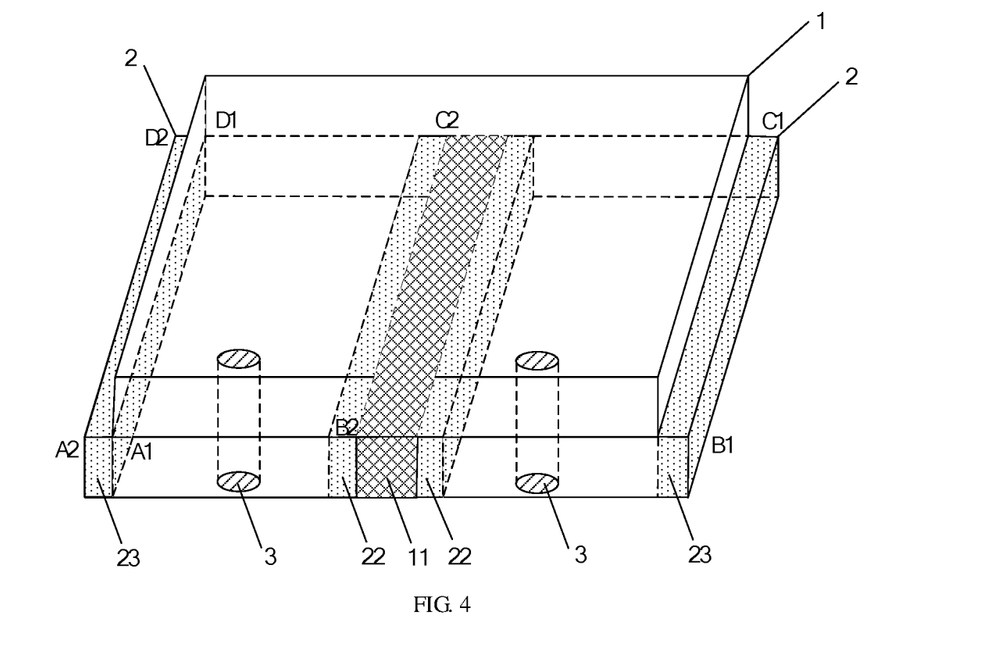
FIG. 4 is another structural schematic view illustrating the display device provided by the embodiment of the present disclosure.
Figure 5:
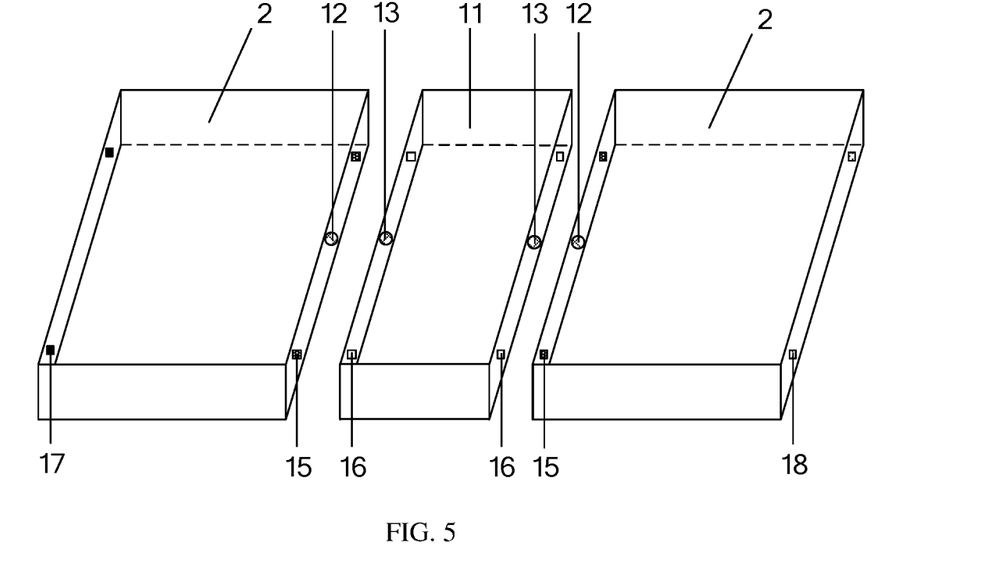
FIG. 5 is another structural schematic view illustrating the display device provided by the embodiment of the present disclosure.
Figure 6:
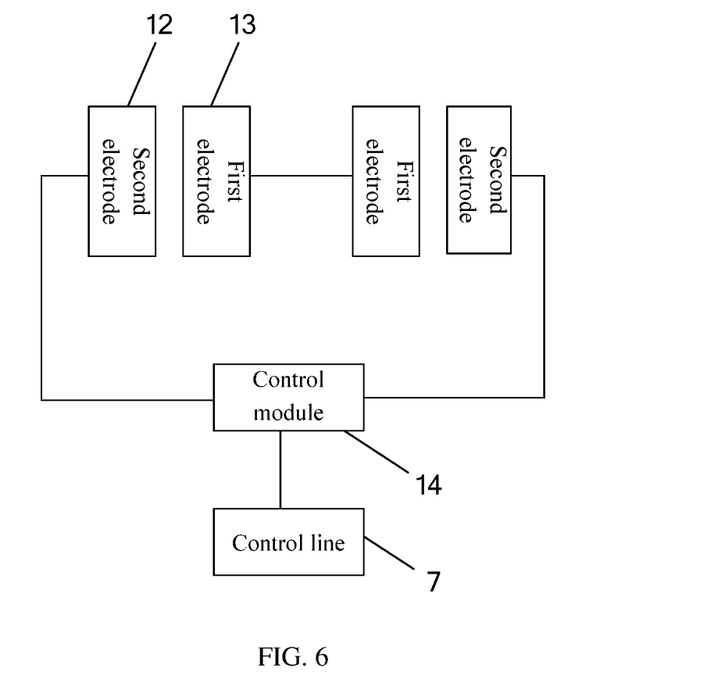
FIG. 6 is a structural schematic view illustrating a circuit provided by the embodiment of the present disclosure.

For example, in the case that the second display screen includes the control line, referring to FIG. 4 and FIG. 5, a positioning part 11 is arranged between the two second display screens 2. Referring to FIG. 5, a second electrode 12 is arranged on a side surface of each second display screen 2 in contact with the positioning part 11; a first electrode 13 is arranged on a side surface of the positioning part 11 in contact with each second display screen 2, and in a position corresponding to the second electrode 12; and two first electrodes 13 of the positioning part 11 are electrically connected with each other. The display device for example further comprises: a control module. Referring to FIG. 6, the control module 14 is connected with each second electrode 12 and the control line 7, and configured for inputting the turning-off signal to the control line 7 in a case where the first electrode 13 is in contact with the second electrode 12 and/or inputting the turning-on signal to the control line 7 in a case where the first electrode 13 is separated from the second electrode 12.

It should be noted that, shape and thickness of the positioning part are not limited by the embodiment of the present disclosure. In order to reduce difficulty in fabrication, for example, the positioning part and the second display screen have the same shape and thickness. In addition, sizes and specific positions of the first electrode and the second electrode are not limited; and exemplarily, the second electrode is located on an upper portion, a middle portion, or a lower portion of the side surface of the second display screen in contact with the positioning part, and the embodiment and drawings of the present disclosure are all described by taking an example that the second electrode is located in the middle portion of the side surface of the second display screen in contact with the positioning part. The first electrode has a situation similar to that of the second electrode, which will not be repeated here. In addition, the two first electrodes of the positioning part may be connected with each other through one leading wire, or may be electrically connected with each other through other circuit structures, which is not limited here, and the embodiment and drawings of the present disclosure are all described by taking an example that the two first electrodes are electrically connected with each other through one leading wire.

It should be further noted that, a position and a structure of the control module are not limited by the embodiment of the present disclosure; and exemplarily, the control module may be formed on a separate circuit board, or may be integrated onto a circuit board of an other circuit structure, such as, a circuit board of a source electrode driving circuit of the second display screen, which is not specifically limited here. In addition, the control module and the second electrode may be connected through one leading wire, or may be electrically connected with each other through other circuit structures, and the former is simpler to implement.

In the display device, in the case that the second electrodes of the two second display screens are in contact with the first electrodes of the positioning part, the turning-off signal is input to the control line, to realize turning off of the pixel unit of the second display screen connected with the first sub-line; and in the case that the second electrodes of the two second display screens are separated from the first electrodes of the positioning part, the turning-on signal is input to the control line, to realize display of the pixel unit of the second display screen connected with the first sub-line. In this way, it is only necessary to control whether the second electrodes of the two second display screens are in contact with the first electrodes of the positioning part, so that display or turning off of the pixel unit of the second display screen connected with the first sub-line is controlled, and further partial display or full display of the second display screen is realized, which has strong operability.

Figure 7:
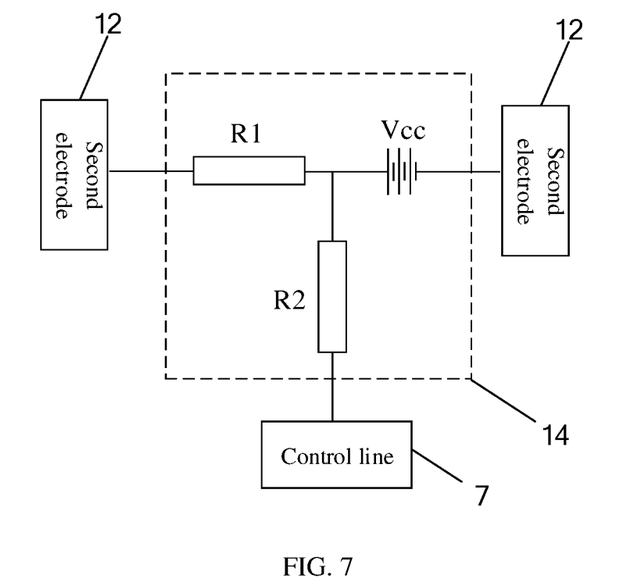
FIG. 7 is a structural schematic view illustrating another circuit provided by the embodiment of the present disclosure.

For example, referring to FIG. 7, the control module 14 includes: a first resistor R1 and a power source Vcc which are connected in series between the two second electrodes 12; and a second resistor R2, one end of the second resistor R2 being connected between the first resistor R1 and the power source Vcc, and the other end thereof being connected with the control line 7.

It should be noted that, the power source may be a voltage source, or may be a current source, which is not limited here, and the embodiment and drawings of the present disclosure are described by taking the voltage source as an example. In addition, resistance values of the first resistor and the second resistor and a magnitude of the power source are not limited here, which are selected according to actual situations. The above circuit structure is simple to implement and has low cost.

For example, referring to FIG. 5, a first magnetic part 15 is further arranged on the side surface of each second display screen 2 in contact with the positioning part 11, a second magnetic part 16 is arranged on the side surface of the positioning part 11 in contact with each second display screen 2 and in a position corresponding to the first magnetic part 15, and the first magnetic part 15 and the second magnetic part 16 have opposite magnetic properties.

It should be noted that, a number of the first magnetic part and a number of the second magnetic part are not limited here, and the embodiment and drawings of the present disclosure are all described by taking an example that each second display screen comprises two first magnetic parts.

The first magnetic part of the second display screen and the second magnetic part of the positioning part attract each other to fix the second display screen with the positioning part, and meanwhile it is conducive to the second electrode of the second display screen in good contact with the first electrode of the positioning part.

Figure 8:
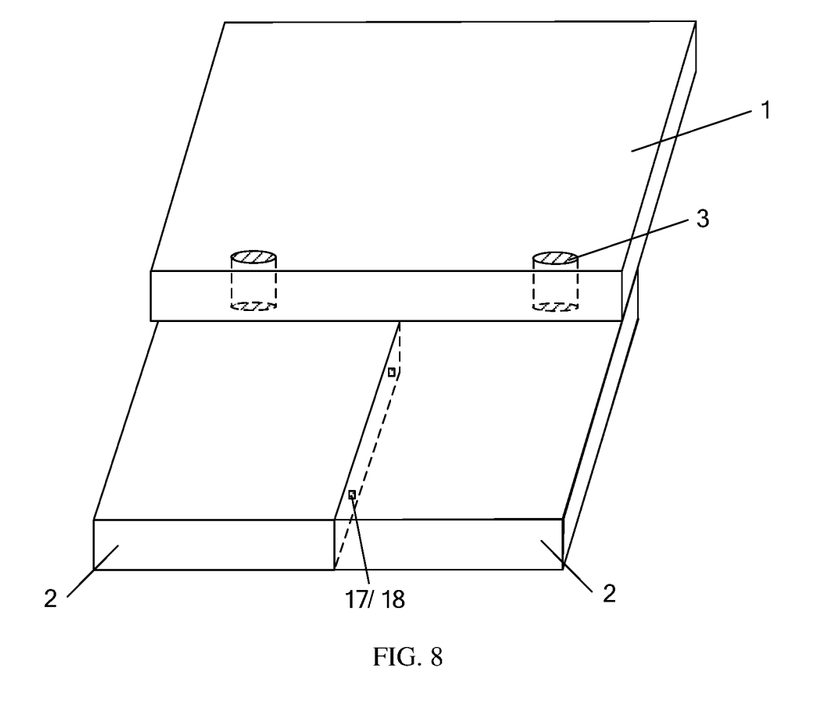
FIG. 8 is a structural schematic view illustrating a display screen group in FIG. 1 after rotating out from a first display screen.

For example, referring to FIG. 5, a third magnetic part 17 and a fourth magnetic part 18 are respectively arranged on side surfaces of the two second display screens 2 in contact with each other after the two second display screens 2 rotate out of the first display screen 1, and the third magnetic part 17 and the fourth magnetic part 18 have opposite magnetic properties. Referring to FIG. 8, the third magnetic part 17 and the fourth magnetic part 18 attract each other, which is conducive to fixing the two second display screens together after the two second display screens rotate out of the first display screen 1 and splice with each other.

For example, for ease of fabrication, the respective second display screens in the display screen group have a same width, and each second display screen and the first display screen have a same length.

Figure 9:
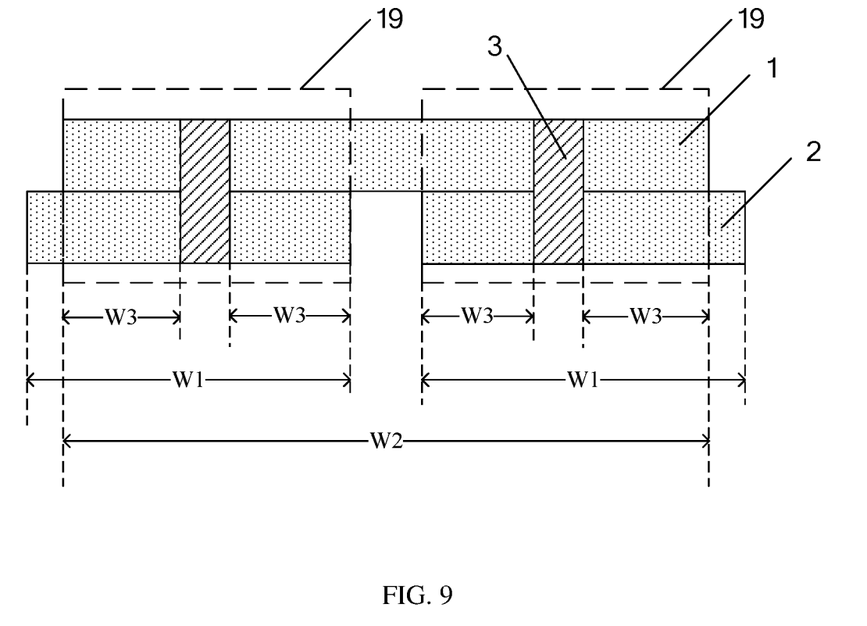
FIG. 9 is a cross-sectional view along a M1M2 direction in FIG. 1.

For example, referring to FIG. 9, a sum of widths W1 of the two second display screens 2 is equal to a width W2 of the first display screen 1. For example, the rotating shaft 3 of each second display screen 2 is located in a middle position of a region where the first side edge of the second display screen 2 overlaps with the first side edge of the first display screen 1, that is, as shown in FIG. 9, distances from the rotating shaft 3 to outmost sides of the overlapping region 19 are W3.

It should be noted that, the widths of the two second display screens may be same, or may be different, and the embodiment and drawings of the present disclosure are all described by taking an example that the two second display screens have the same width. In addition, in the case that the first display screen completely cover the two second display screens, the rotating shaft of each second display screen is located in a middle position of the first side edge of the second display screen; in the case that the first display screen partially cover the two second display screens, for example, ⅓ portion of the first side edge of the second display screen protrudes from the first side edge of the first display screen, the other ⅔ portions of the first side edge of the second display screen overlaps with the first side edge of the first display screen, and in this case, the rotating shaft of each second display screen is located in a middle position of the other ⅔ portions of the first side edge of the second display screen.

Figure 10:
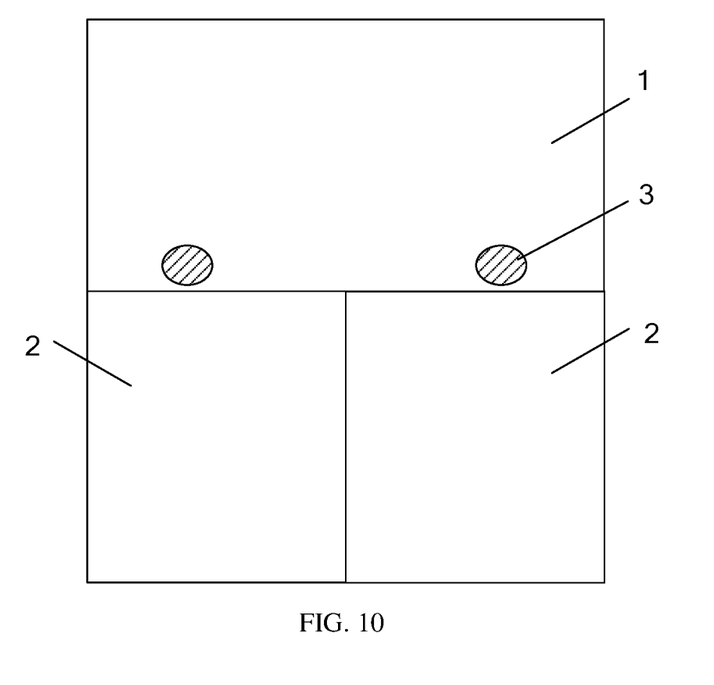
FIG. 10 is a top view of FIG. 8.

Referring to FIG. 10, after the two second display screens 2 rotate around the rotating shafts 3 and out of the first display screens, the two second display screens are well spliced with the first display screen 1.

Figure 11:
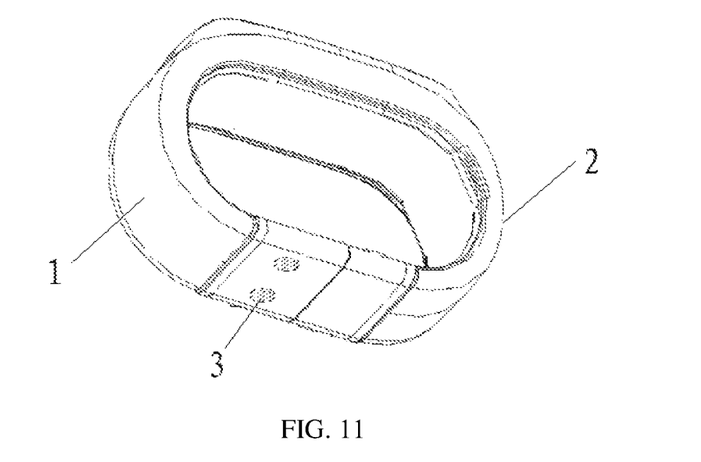
FIG. 11 is a schematic view after bending the structure in FIG. 10.

For example, the first display screen and the second display screens in the display screen group are all flexible screens, so that the first display screen and the second display screens are bent to form different shapes, so as to facilitate carrying and aesthetics. For example, in the case that the display screen group includes two second display screens, the two second display screens rotate to be spliced with the first display screen, and then the two second display screens and the first display screen are bent to form a wristband shape as shown in FIG. 11, so as to facilitate carrying.

Embodiment II

The embodiment of the present disclosure provides a display screen, and referring to FIG. 2, the display screen comprises a plurality of gate lines 4, and a plurality of shift register units 5 respectively connected with the gate lines 4; each gate line 4 includes a first sub-line 41 and a second sub-line 42 which are disconnected from each other, and ends of the first sub-line 41 and the second sub-line 42 close to each other are respectively connected with a first end 61 and a second end 62 of the first switch 6, and the other end of the second sub-line 42 is connected with the shift register unit 5; and a control end 63 of each first switch 6 is connected with a control line 7, and the control line 7 is configured for inputting a turning-on signal and/or a turning-off signal to the control end 63 of the first switch 6.

The display screen may serve as the second display screen of the display device as described above, and of course, the display screen may be used alone, which is not specifically limited here.

It should be noted here that, positions of the gate lines, the shift register units, the first switches and the control line are not specifically limited by the embodiment of the present disclosure, as long as the connecting relationship described above is met, and the embodiment of the present disclosure is described by taking positional relationships shown in FIG. 2 as an example. In addition, referring to FIG. 2, the display screen for example further comprises a plurality of data lines 8, and a plurality of pixel units 9 formed by the plurality of data lines 8 and the plurality of gate lines 4 intersecting with each other, and each pixel unit 9 is connected with its corresponding gate line 4 and its corresponding data line 9, so as to acquire a gate line signal and a data line signal to realize display. In addition, the display screen may further comprise other layer structures or thin films and the like, which will not be repeated here. In addition, a disconnecting position of each gate line is not limited by the embodiment of the present disclosure, which may be selected according to actual situations.

It should be further noted that, one end of the control line is connected with the control end of each first switch, and the other end of the control line may be connected with an other control module or may be directly connected with a signal source, which is not specifically limited here, as long as the control line inputs the turning-on signal and/or the turning-off signal to the control end of the first switch.

In addition, the display screen for example is a liquid crystal display screen, or a self-luminous display screen, for example, an Organic Light Emitting Diode (OLED) display screen; and of course, the display screen may be a display screen of an other type, which is not specifically limited here, and may be determined according to actual situations.

Referring to FIG. 2, in the display screen, the control line 7 inputs the turning-on signal and/or the turning-off signal to the first switch 6, so that whether the first sub-line 41 acquires a signal output from the shift register unit 5 is controlled, and further display or turning off of the pixel unit connected with the first sub-line 41 is controlled, and thus partial display or full display in the display screen is realized.

For example, referring to FIG. 2, the shift register units 5 are located on a third side edge of the display screen, and each gate line 4 of the display screen is perpendicular to the third side edge; and a connecting line 61 of positions where the first switches 6 of the display screen are located is perpendicular to the respective gate lines 4.

It should be noted here that, referring to FIG. 3, the display screen is described by taking a second display screen located on a left side as an example, and the third side edge of the display screen is a left edge side 23 of the display screen; of course, the third side edge of the display screen may be an edge portion 22 on a right side in FIG. 3 or an edge portion of an other side. The embodiment and drawings of the present disclosure are described by taking an example that the third side edge of the display screen is the left side edge 23 of the display screen, which is only convenient for description of the present disclosure and simplifying the description, but do not indicate or imply that the devices or components must have specific directions, or be constructed or operated in the specific directions, and are not limitative of the present disclosure.

A wiring structure of the display screen is reasonable and simple, and the display screen has high aperture ratio.

Figure 12:
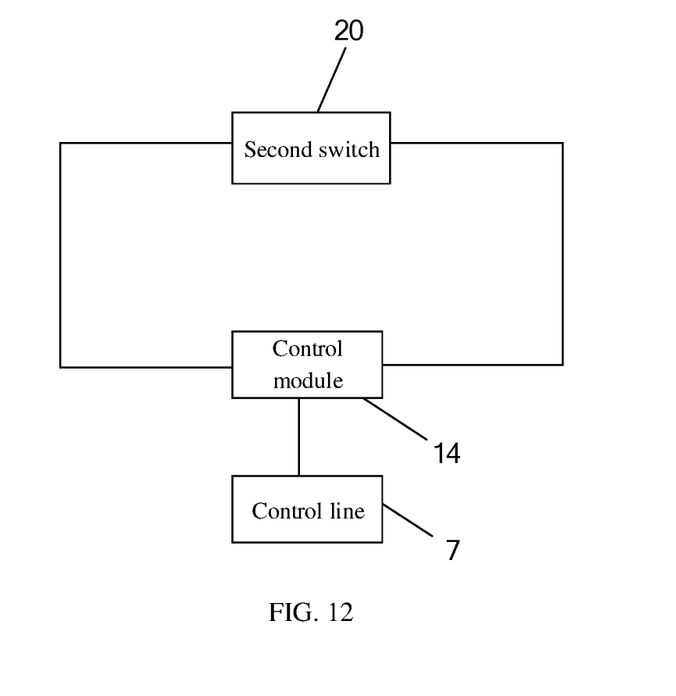
FIG. 12 is a structural schematic view illustrating another circuit provided by the embodiment of the present disclosure.

For example, referring to FIG. 12, the display screen further comprises: a second switch 20 and a control module 14; the control module 14 is connected with the control line 7 and the second switch 20; in the case that the second switch 20 is turned off, the control module 14 inputs the turning-off signal to the control line 7; and in the case that the second switch 20 is turned on, the control module inputs the turning-on signal to the control line 7.

It should be noted that, a position and a structure of the control module are not limited by the embodiment of the present disclosure; and exemplarily, the control module may be formed on a separate circuit board, or may be integrated on a circuit board of an other circuit structure, for example, a circuit board of a source electrode driving circuit of the display screen, which is not specifically limited here. In addition, the control module and the second switch may be connected through one leading wire, or may be electrically connected with each other through other circuit structures, and the former is simpler to implement.

It should be further noted that, a specific structure of the second switch is not limited here; and exemplarily, the second switch may be a thin film transistor switch, may be a toggle switch, a button switch and the like, or may be that a role of switch is realized by getting or not getting the first electrode contact with the second electrode as described in the above display device, and of course, may be realized in other implementation modes.

The display screen controls inputting the turning-on signal and/or the turning-off signal to the control line by turning-on or turning-off the second switch, and further display or turning-off of the pixel unit connected with the first sub-line is controlled, and finally partial display and full display of the display screen is realized, which has strong operability.

Figure 13:
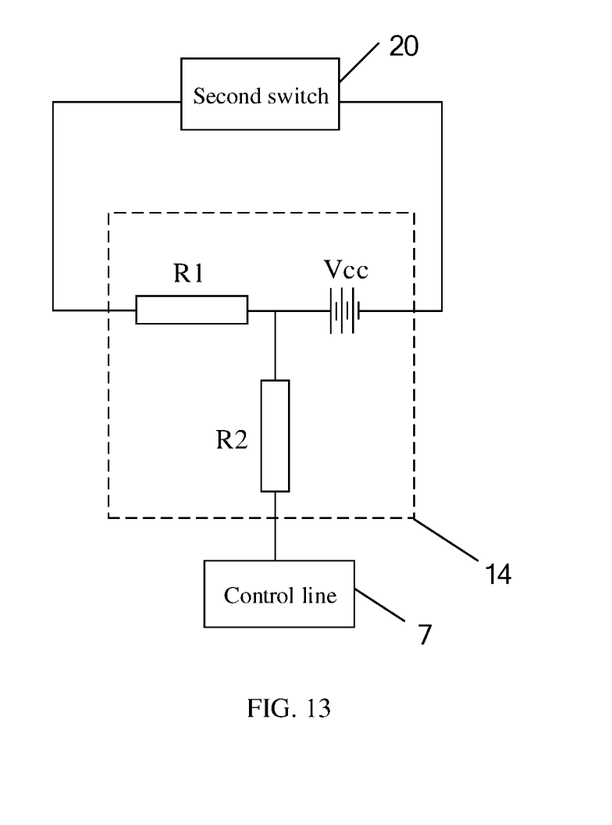
FIG. 13 is a structural schematic view illustrating another circuit provided by the embodiment of the present disclosure.

For example, referring to FIG. 13, the control module includes: a first resistor R1 and a power source Vcc which are connected with the second switch 20 in series; and a second resistor R2, one end of the second resistor R2 being connected between the first resistor R1 and the power source Vcc, and the other end of the second resistor R2 being connected with the control line 7.

It should be noted that, the power source may be a voltage source, or may be a current source, which is not limited here, and the embodiment and drawings of the present disclosure are described by taking the voltage source as an example. In addition, resistance values of the first resistor and the second resistor and a magnitude of the power source are not limited here, which are selected according to actual situations. The above circuit structure is simple to implement and has low cost.

The foregoing embodiments merely are exemplary embodiments of the disclosure, and not intended to define the scope of the disclosure, and the scope of the disclosure is determined by the appended claims.

The present application claims priority of Chinese Patent Application No. 201510310282.X filed on Jun. 8, 2015, the disclosure of which is incorporated herein by reference in its entirety as part of the present application.

What is claimed is:

1. A display device, comprising:
a first display screen;
a display screen group, arranged on a back surface of the first display screen, the display screen group including at least one second display screen, and a display surface of the second display screen facing the first display screen; and
a rotating shaft, the rotating shaft connecting a first side edge of the second display screen in the display screen group with a first side edge of the first display screen, and being perpendicular to the first display screen and the second display screen,
wherein the second display screen includes a plurality of gate lines, a plurality of data lines, a plurality of pixel units formed by the plurality of gate lines and the plurality of data lines intersecting with each other, a plurality of first switches, and a plurality of shift register units respectively connected with the gate lines,
wherein each of the gate lines of the second display screen includes a first sub-line and a second sub-line which are disconnected from each other, ends of the first sub-line and the second sub-line close to each other are respectively connected with a first end and a second end of the first switch, and the other end of the second sub-line is connected with the shift register unit,
wherein the plurality of pixel units comprises a first pixel unit and a second pixel unit, the first sub-line of each of the gate lines is directly connected with the first pixel unit and is not directly connected with the second pixel unit, and the second sub-line of each of the gate lines is directly connected with the second pixel unit and is not directly connected with the first pixel unit, wherein along an extension direction of the gate lines, the plurality of first switches are provided between a region in which the first pixel unit is provided and a region in which the second pixel unit is provided, wherein a control end of each of the first switches of the second display screen is connected with a same signal line, and the same signal line is configured for inputting a turning-on signal and/or a turning-off signal to the control end of each first switch, and wherein the plurality of first switches and the signal line are provided outside the plurality of shift register units.

2. The display device according to claim 1, wherein the display screen group includes two of the second display screens arranged side by side.

3. The display device according to claim 2, wherein side edges of the two second display screens close to each other are second side edges, side edges opposite to the second side edges are third side edges, and the third side edge of each of the second display screens protruding out from a side edge of the first display screen which is on a same side with the third side edge of each of the second display screens, and wherein at least one of the pixel units of the second display screen protruding out from the first display screen is the second pixel unit connected with the second sub-line.

4. The display device according to claim 3, wherein the first side edge of the second display screen intersects with the third side edge and the second side edge of each of the second display screens.

5. The display device according to claim 3, wherein the shift register units of the second display screen are located on the third side edge of each of the second display screens, and each of the gate lines of the second display screen is perpendicular to the third side edge of each of the second display screens, and wherein a connecting line of positions where the first switches of the second display screen are located is perpendicular to the gate lines, and is located in a projection region of the side edge of the first display screen which is on the same side with the third side edge of each of the second display screens on the display surface of the second display screen.

6. The display device according to claim 2, wherein a positioning part is arranged between the two second display screens, wherein a second electrode is arranged on a side surface of each of the second display screens in contact with the positioning part, a first electrode is arranged on a side surface of the positioning part in contact with each of the second display screens and in a position corresponding to the second electrode, and the first electrode of the positioning part arranged on the side surface of the positioning part in contact with one of the second display screens and the first electrode of the positioning part arranged on the side surface of the positioning part in contact with the other of the second display screens are electrically connected with each other, wherein the display device further comprises a control circuit, the control circuit is connected with each of the second electrodes and the signal line, wherein the control circuit is further configured to input the turning-off signal to the signal line if the first electrode is in contact with the second electrode, and wherein the control circuit is further configured to input the turning-on signal to the signal line if the first electrode is separated from the second electrode.

7. The display device according to claim 6, wherein the control circuit includes:

a first resistor and a power source which are connected in series between two of the second electrodes; and a second resistor, one end of the second resistor being connected between the first resistor and the power source, and the other end of the second resistor being connected with the signal line.

8. The display device according to claim 6, wherein a first magnetic part is further arranged on the side surface of each of the second display screens in contact with the positioning part, a second magnetic part is arranged on the side surface of the positioning part in contact with each of the second display screens and in a position corresponding to the first magnetic part, and the first magnetic part and the second magnetic part have opposite magnetic properties.

9. The display device according to claim 1, wherein a plurality of the second display screens are provided, the second display screens in the display screen group have a same width, and each of the second display screens and the first display screen have a same length.

10. The display device according to claim 3, wherein a sum of widths of the two second display screens is equal to a width of the first display screen, and a rotating shaft of each of the second display screens is located in a middle position of a region where the first side edge of the second display screen overlaps with the first side edge of the first display screen.

11. The display device according to claim 1, wherein a plurality of the second display screens are provided, a third magnetic part and a fourth magnetic part are respectively arranged on side surfaces of two adjacent second display screens in contact with each other after the two adjacent second display screens rotate out from the first display screen, and the third magnetic part and the fourth magnetic part have opposite magnetic properties.

12. The display device according to claim 1, wherein the first display screen and the second display screen in the display screen group are all flexible screens.

13. A display screen, comprising a plurality of gate lines, a plurality of data lines, a plurality of pixel units formed by the plurality of gate lines and the plurality of data lines intersecting with each other, a plurality of first switches, and a plurality of shift register units respectively connected with the gate lines, wherein each of the gate lines includes a first sub-line and a second sub-line which are disconnected from each other, ends of the first sub-line and the second sub-line close to each other are respectively connected with a first end and a second end of the first switch, and the other end of the second sub-line is connected with the shift register unit, wherein the plurality of pixel units comprises a first pixel unit and a second pixel unit, the first sub-line of each of the gate lines is directly connected with the first pixel unit and is not directly connected with the second pixel unit, and the second sub-line of each of the gate lines is directly connected with the second pixel unit and is not directly connected with the first pixel unit, wherein along an extension direction of the gate lines, the plurality of first switches are provided between a region in which the first pixel unit is provided and a region in Which the second pixel unit is provided, wherein a control end of each of the first switches is connected with a same signal line, and the same signal line is configured for inputting a turning-on signal and/or a turning-off signal to the control end of the first switch, and wherein the plurality of first switches and the signal line are provided outside the plurality of shift register units.

14. The display screen according to claim 13, wherein the shift register units are located on a third side edge of the display screen, the gate lines of the display screen are perpendicular to the third side edge, and a connecting line of positions where the first switches of the display screen are located is perpendicular to the gate lines.

15. The display screen according to claim 13, wherein the display screen further comprises a second switch and a control circuit, and the control circuit is connected with the signal line and the second switch, wherein in the case that the second switch is turned off, the control circuit inputs the turning-off signal to the signal line, and wherein in the case that the second switch is turned on, the control circuit inputs the turning-on signal to the signal line.

16. The display screen according to claim 15, wherein the control circuit includes:

a first resistor and a power source which are connected with the second switch in series; and a second resistor, one end of the second resistor being connected between the first resistor and the power source, and the other end of the second resistor being connected with the signal line.

17. The display screen according to claim 14, wherein the display screen further comprises a second switch and a control circuit, and the control circuit is connected with the signal line and the second switch, wherein in the case that the second switch is turned off, the control circuit inputs the turning-off signal to the signal line, and wherein in the case that the second switch is turned on, the control circuit inputs the turning-on signal to the signal line.

18. A display device, comprising:

a first display screen;

a display screen group, arranged on a back surface of the first display screen, the display screen group including two second display screens arranged side by side, and a display surface of each second display screen facing the first display screen; and a rotating shaft, the rotating shaft connecting a first side edge of each second display screen in the display screen group with a first side edge of the first display screen, and being perpendicular to the first display screen and each second display screen, wherein each second display screen includes a plurality of gate lines, a plurality of first switches, and a plurality of shift register units respectively connected with the gate lines, wherein each of the gate lines of each second display screen includes a first sub-line and a second sub-line which are disconnected from each other, ends of the first sub-line and the second sub-line close to each other are respectively connected with a first end and a second end of the first switch, and the other end of the second sub-line is connected with the shift register unit, wherein a control end of each of the first switches of each second display screen is connected with a signal line, and the signal line is configured for inputting a turning-on signal and/or a turning-off signal to the control end of each first switch, wherein a positioning part is arranged between the two second display screens, wherein a second electrode is arranged on a side surface of each of the second display screens in contact with the positioning part, a first electrode is arranged on a side surface of the positioning part in contact with each of the second display screens and in a position corresponding to the second electrode, and the first electrode of the positioning part arranged on the side surface of the positioning part in contact with one of the second display screens and the first electrode of the positioning part arranged on the side surface of the positioning part in contact with the other of the second display screens are electrically connected with each other, wherein the display device further comprises a control circuit, the control circuit is connected with each of the second electrodes and the signal line, wherein the control circuit is further configured to input the turning-off signal to the signal line if the first electrode is in contact with the second electrode, and wherein the control circuit is further configured to input the turning-on signal to the signal line if the first electrode is separated from the second electrode.

* * * * *